(12) United States Patent
Handa

(10) Patent No.: US 8,113,709 B2
(45) Date of Patent: Feb. 14, 2012

(54) HIGH-PRESSURE TANK

(75) Inventor: Kiyoshi Handa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 451 days.

(21) Appl. No.: 12/365,927

(22) Filed: Feb. 5, 2009

(65) Prior Publication Data

US 2009/0200318 A1   Aug. 13, 2009

(30) Foreign Application Priority Data

Feb. 7, 2008   (JP) ................. 2008-027355

(51) Int. Cl.
*F16C 1/04*     (2006.01)
*F16C 13/00*    (2006.01)
*H01M 8/00*     (2006.01)
*H01M 8/04*     (2006.01)
*B60K 15/03*    (2006.01)

(52) U.S. Cl. .......................... 374/141; 220/581; 141/82

(58) Field of Classification Search .................. 374/141; 220/581, 582, 592.01; 141/82; 429/434; 219/202

See application file for complete search history.

(56) References Cited

U.S. PATENT DOCUMENTS

| | | | | |
|---|---|---|---|---|
| 4,335,697 A * | 6/1982 | McLean | ......................... | 123/527 |
| 5,169,031 A * | 12/1992 | Miller | ......................... | 222/146.5 |
| 5,209,115 A * | 5/1993 | Bond | ............................. | 73/295 |
| 6,276,473 B1 * | 8/2001 | Zur Megede | .............. | 180/65.25 |
| 6,942,384 B2 * | 9/2005 | Schmidt | ........................ | 374/208 |
| 7,525,072 B2 * | 4/2009 | Pechtold et al. | ............. | 219/550 |
| 7,536,786 B2 * | 5/2009 | Toh et al. | ................. | 29/890.121 |
| 7,743,797 B2 * | 6/2010 | Handa | ............................. | 141/82 |
| 7,846,595 B2 * | 12/2010 | Elwart et al. | ................. | 429/427 |
| 7,938,149 B2 * | 5/2011 | Handa | ............................. | 141/82 |
| 2003/0035462 A1 * | 2/2003 | Savoie | ......................... | 374/141 |
| 2004/0182869 A1 * | 9/2004 | Kubo et al. | .................... | 220/581 |
| 2006/0246177 A1 * | 11/2006 | Miki et al. | ...................... | 426/24 |

(Continued)

FOREIGN PATENT DOCUMENTS

JP          06-201045          7/1994

(Continued)

OTHER PUBLICATIONS

Japanese Office Action for Application No. 2008-027355, dated Mar. 30, 2010.

(Continued)

*Primary Examiner* — R. A. Smith
(74) *Attorney, Agent, or Firm* — Nelson Mullins Riley & Scarborough LLP; Anthony A. Laurentano

(57) ABSTRACT

A high-pressure tank is provided capable of simply and inexpensively suppressing gas leaks under low temperature condition. The high-pressure tank 10 comprises a tank main body 11 having the opening part 13, in which high-pressure gas is filled, and the reinforcement member 12 covering the outer surface of the tank main body 11 and reinforcing the tank main body 11. The tank main body 11 is provided with the outer projecting part 15 being uncovered with the reinforcement member 12 at a position different from the opening part 13. This outer projecting part 15 is heated from the outside of the tank main body 11 by the electric heater 30 to heat the tank main body 11, and thereby suppressing degradation of the sealing properties of the seal member 22.

7 Claims, 8 Drawing Sheets

U.S. PATENT DOCUMENTS

| | | | |
|---|---|---|---|
| 2007/0015013 A1* | 1/2007 | Pechtold et al. | 429/13 |
| 2008/0060714 A1* | 3/2008 | Kallo | 141/82 |
| 2008/0105691 A1* | 5/2008 | Schlag | 220/581 |
| 2009/0159258 A1* | 6/2009 | Handa | 165/287 |

FOREIGN PATENT DOCUMENTS

| | | |
|---|---|---|
| JP | 2002-181295 | 6/2002 |
| JP | 2003-028394 | 1/2003 |
| JP | 2003-270056 | 9/2003 |
| JP | 2004-209499 | 7/2004 |
| JP | 2005-16549 | 1/2005 |
| JP | 2005178524 A * | 7/2005 |
| JP | 2006-220234 | 8/2006 |
| JP | 2007-16988 | 1/2007 |
| JP | 2007-182974 | 7/2007 |
| JP | 2008-8378 | 1/2008 |
| WO | WO 2006129878 A1 * | 12/2006 |
| WO | WO 2009090491 A2 * | 7/2009 |

OTHER PUBLICATIONS

Japanese Office Action for Application No. 2008-027355, dated Nov. 17, 2009.

* cited by examiner

HIGH-PRESSURE TANK

This application is based on and claims the benefit of priority from Japanese Patent Application No. 2008-027355, filed on 7 Feb. 2008, the content of which is incorporated herein by reference.

BACKGROUND OF THE INVENTION

1. Field of the Invention

The present invention relates to a high-pressure tank filled with high-pressure gas. Specifically, it relates to a high-pressure tank capable of suppressing gas leaks easily and inexpensively under low temperature condition.

2. Related Art

Conventionally, a vehicle using high-pressure gas such as natural gas and hydrogen as fuel mounts a high-pressure tank filled with this gas. In this high-pressure tank, a rubber seal member such as an O-ring is installed to maintain the airtightness.

However, since this seal member is made of rubber, the seal member deteriorates when the temperature becomes an extremely low temperature (e.g. −50° C.), which causes the sealing properties to degrade. Accordingly, the gas may leak from the high-pressure tank. For example, when the vehicle mounting the above-mentioned high-pressure tank travels across a cold district, gas in a high-pressure tank is consumed as the travel distance increases, and then the pressure in the high-pressure tank decreases. Accordingly, gas remaining in the high-pressure tank expands, which causes the temperature to decrease to an extremely low temperature.

To solve this problem, it has been proposed that a technique for suppressing reduction in the temperature of the seal member by heating a high-pressure tank (for example, refer to Japanese Published Unexamined Patent Application No. 2006-220234).

That is, a hydrogen storing alloy accommodating container in which hydrogen storing alloy generating heat by occluding hydrogen is accommodated is connected with a hydrogen circulation channel extending from a tank main body accommodating hydrogen to a fuel cell, and further thermally connected with the tank main body through a heat pipe. According to this technique, when the temperature decreases to an extremely low temperature, hydrogen storing alloy generates heat by occluding hydrogen. This heat is transferred to the tank main body through the heat pipe, and then the tank main body is warmed.

However, in the technique proposed by the above-mentioned patent, there has been a problem that hydrogen accommodated in the tank main body is required to be supplied once to the hydrogen storing alloy accommodating container in order to warm the tank main body, which causes the device configuration to be complex and costly.

SUMMARY OF THE INVENTION

An objective of the present invention is to provide a high-pressure tank capable of suppressing gas leaks easily and inexpensively under low temperature condition.

To achieve the above-mentioned objective, a high-pressure tank (for example, the below-mentioned high-pressure tank 10) according to the present invention comprises: an opening part (for example, the below mentioned opening part 13); a tank main body (for example, the below-mentioned tank main body 11) in which high-pressure gas is filled; and a reinforcement member (for example, the below-mentioned reinforcement member 12) covering the outer surface of the tank main body and reinforcing the tank main body, in which the tank main body is provided with an exposed part (for example, the below-mentioned outer projecting part 15) being uncovered with the reinforcement member at a position different from the opening part; and a heater (for example, the below-mentioned electric heating heater 30) heating the exposed part from the outside of the tank main body.

According to this invention, the exposed part provided at a position different from the opening part is heated with the heater, whereby the entire tank main body can be warmed through this exposed part, and thus excess reduction in the temperature of the seal member can be suppressed. Therefore, even under low temperature condition, deterioration of the seal member, which causes the sealing properties to degrade, can be suppressed, whereby the gas leaks from the tank main body can be effectively suppressed.

In this case, it is preferred that the exposed part is the outer projecting part (for example, the below-described outer projecting part 15) projectably formed outward when the tank main body is manufactured.

The tank main body is manufactured by the flow-forming process, the spinning process, and the like. Thus, the tank main body is held during this molding process, and thereby forming a shape in which a part of the tank main body projects. According to the present invention, since the projecting portion formed during this molding process as the outer projecting part is used, substantial structural modification for mounting the heater is unnecessary, and thus the rise in manufacturing cost can be suppressed.

In addition, since the outer projecting part is at a position different from the opening part as described above, the tank main body can be heated without contacting the heater with a member provided at the vicinity of the opening part. Furthermore, in the case in which the tank main body is formed of aluminum alloy with excellent thermal conductivity, the vicinity of the opening part can be heated through thermal conduction of the tank main body even by heating the outer projecting part away from the opening part.

In addition, since the outer projecting part is not a circulation channel of inflammable gas such as hydrogen unlike the opening part, the tank main body can be safely heated by heating the outer projecting part.

By the way, since a plurality of members are disposed at the vicinity of the opening part of the high-pressure tank, it is difficult to secure a space to which equipment for warming the seal member is added. The plurality of members disposed at the vicinity of the opening part include for example, a check valve preventing backflow when gas is filled, a solenoid valve used on outgassing, a regulator for pressure-adjusting, a pressure sensor measuring gas-compression, a thermal sensor measuring gas temperature, a pipe for supplying gas, the above-mentioned seal member for maintaining airtightness, and the like. However, according to this invention, the exposed part provided at a position different from the opening part is heated, so that a space for mounting the heater can be easily secured.

In addition, since the exposed part is heated with the heater, the heater does not directly contact with high-pressure gas in the tank main body. Therefore, a structure for withstanding high pressure is unnecessary for the heater, whereby the parts count can be reduced, and thus the size and weight of the entire device can be reduced.

Furthermore, the tank main body is heated through the exposed part by properly heating the exposed part with the heater under low temperature condition, and then gas in the tank main body is warmed, so that the range of gas temperature change can be reduced.

By the way, for example, the tank main body is formed of aluminum alloy, and the reinforcement member is formed by wrapping a reinforced fiber such as a carbon fiber on which adhesive such as epoxy resin adheres around the tank main body. In this case, since the thermal expansion coefficient of the tank main body and the reinforcement member are unequal, substantial thermal stress is generated when the high-pressure tank is exposed under a widely temperature-changeable environment, and thus the durability of the high-pressure tank may decrease. However, according to the present invention, the temperature change of the entire tank main body is reduced when the tank main body is properly heated with the heater to transfer heat from the exposed part to the opening part, compared with the conventional case in which the opening part is heated directly. Accordingly, the thermal stress generated by the difference between the thermal expansion coefficients of the tank main body and the reinforcement member can be reduced, and thus reduction in the durability of the high-pressure tank can be suppressed.

In this case, it is preferred that the heater (for example, the below-mentioned electric heater 30 and heater mounting member 40) is mounted detachably on the exposed part.

According to the present invention, the heater is mounted detachably on the exposed part of the tank main body, whereby, the heater is detached once, for example, when the mounting locations of the tank main body and the reinforcement member are moved, and the heater is attached after the tank main body and the reinforcement member are moved. Accordingly, the heater is prevented from being damaged and broken down caused by accidental contact and the like, while the tank main body and the reinforcement member, which are heavy parts, are being moved. In addition, the flexibility of the mounting layout of the high-pressure tank can be improved compared with the case in which the heater is undetachable. Furthermore, even if the heater breaks down, this heater can be easily replaced with a non-defective heater.

In this case, it is preferred that the high-pressure tank further comprises a thermal sensor and an electronic control unit (for example, the below-mentioned thermal sensor 35 and electronic control unit) measuring or estimating the temperature of the seal member provided on the opening part, wherein, when the temperature measured or estimated by the thermal sensor and the electronic control unit is less than a determination temperature (for example, the below-mentioned temperature TL) at which the function of the seal member can be preserved, the heater (for example, the below-mentioned electric heating heater 30) is operated.

According to the present invention, the temperature at which the function of the seal member can be preserved is defined as the determination temperature, and then the heater is operated when the gas temperature measured or estimated by the thermal sensor and the electronic control unit is less than this determination temperature. Accordingly, the tank main body can be heated only when required, and thus heating it efficiently. In addition, as described above, the seal member deteriorates when the temperature is equal to or less than a predetermined extremely low temperature (e.g. −50° C.), which causes the sealing properties to degrade. Accordingly, deterioration of the seal member can be suppressed effectively by properly setting the determination temperature to be higher than this predetermined temperature.

The temperature of the exposed part may be measured by the thermal sensor, and then the temperature of the seal member may be estimated based on this measured temperature. In addition, the temperature of the underpart and the opening part of the tank main body may be measured by the thermal sensor, and then the temperature of the seal member may be estimated based on this measured temperature. The thermal sensor can be selected from among a thermometer capable of digital output, a thermometer using a thermocouple, a contactless infrared thermometer, and the like.

In this case, it is preferred that the heater is an electric heater (for example, the below-mentioned electric heater 30).

According to this invention, an electric heater is used as the heater so that the size of the heater can be reduced compared with a heat exchange means such as a conventional hydrogen storing alloy accommodating container. Accordingly, the heater can be easily detached from the tank main body by threadably mounting the electric heater on the tank main body or by mounting the electric heater on the tank main body through other members with a screw structure. In addition, if the electric heater is operated when the gas temperature is less than a predetermined determination temperature as described above, the electric power consumption can be reduced. Thus, as a power supply of the electric heater, a small external source mounted separately and a battery mounted on the vehicle can be used. Accordingly, the parts count as well as the size and the weight of the entire device can be reduced. When a vehicle mounts a fuel cell, this fuel cell can be used as a power supply of the electric heater.

In the case, it is preferred that the high-pressure tank is mounted on a vehicle, and the heater (for example, the below-mentioned heat pipe 60) heats the tank main body by using heat exhausted from a power plant for a vehicle (for example, the below-mentioned exhaust pipe 50).

The power plant for a vehicle includes a fuel cell and a reciprocating engine which uses high-pressure gas such as natural gas and hydrogen as fuel. According to this invention, the high-pressure tank is mounted on a vehicle. The vehicle is used under a conditionally-severe environment such as a cold district, whereby heating with the heater becomes especially effective. In addition, since gas in the tank main body decreases, and the temperature in the tank main body lowers, as the travel distance increases, it is necessary to suppress the sealing properties of the seal member by heating the tank main body. However, since waste heat generated in the power plant for the vehicle increases as output of the vehicle increases, the tank main body can be heated even with a simple structure but without complex control by using this waste heat, and thus the cost is reduced.

It is preferred that the high-pressure tank is mounted on a vehicle provided with a fuel cell (for example, the below-mentioned fuel cell 70), and the heater heats the tank main body by using waste heat from the fuel cell.

According to the present invention, the energy cost for heating the tank main body 11 can be reduced by using waste heat of the fuel cell to heat the tank main body.

It is preferred that the high-pressure tank is mounted on a vehicle provided with a fuel cell (for example, the below-mentioned fuel cell 70), and the heater heats the tank main body by using heat obtained from a heat exchanger (for example, the below-mentioned exchanger 80) of a cooling system for the fuel cell.

According to the present invention, the energy cost for heating the tank main body can be reduced by using waste heat obtained from the cooling system for the fuel cell to heat the tank main body.

It is preferred that the high-pressure tank is mounted on a vehicle, and the heater heats the tank main body by using waste heat from a battery of the vehicle.

According to the present invention, the energy cost for heating the tank main body can be reduced by using waste heat obtained from the cooling system for the battery to heat the tank main body.

It is preferred that the high-pressure tank is mounted on a vehicle, and the heater heats the tank main body by using heat obtained from a heat exchanger of the cooling system for the vehicle.

According to the present invention, the energy cost for heating the tank main body can be reduced by using heat obtained from a heat exchanger of the cooling system for the vehicle to heat the tank main body.

According to this invention, the exposed part provided to a position different from the opening part is heated with the heater, whereby the entire tank main body can be warmed through this exposed part, and thus excess reduction in the temperature of the seal member provided at the opening part can be suppressed. Therefore, even under low temperature condition, deterioration of the seal member, which causes the sealing properties to degrade, can be suppressed, whereby the gas leaks from the tank main body can be effectively suppressed. In addition, the exposed part provided at a position different from the opening part is heated, so that a space for mounting the heater can be easily secured. Furthermore, since the exposed part is heated with the heater, the heater does not directly contact with high-pressure gas in the tank main body. Therefore, a structure for withstanding high pressure is unnecessary for the heater, whereby the parts count can be reduced, and thus the size and weight of the entire device can be reduced. In addition, the tank main body is heated through the exposed part by properly heating the exposed part with the heater under low temperature condition, and then gas in the tank main body is warmed, so that the range of the gas temperature change can be reduced. Furthermore, the temperature change of the entire tank main body is reduced when the tank main body is properly heated with the heater to transfer heat from the exposed part to the opening part, compared with the conventional case in which the opening part is heated directly. Accordingly, the thermal stress generated by the difference between the thermal expansion coefficients of the tank main body and the reinforcement member can be reduced, and thus reduction in the durability of the high-pressure tank can be suppressed.

DETAILED DESCRIPTION OF THE INVENTION

Hereafter, preferred embodiments of the present invention are described in detail based on the figures.

First Embodiment

Figure 1:
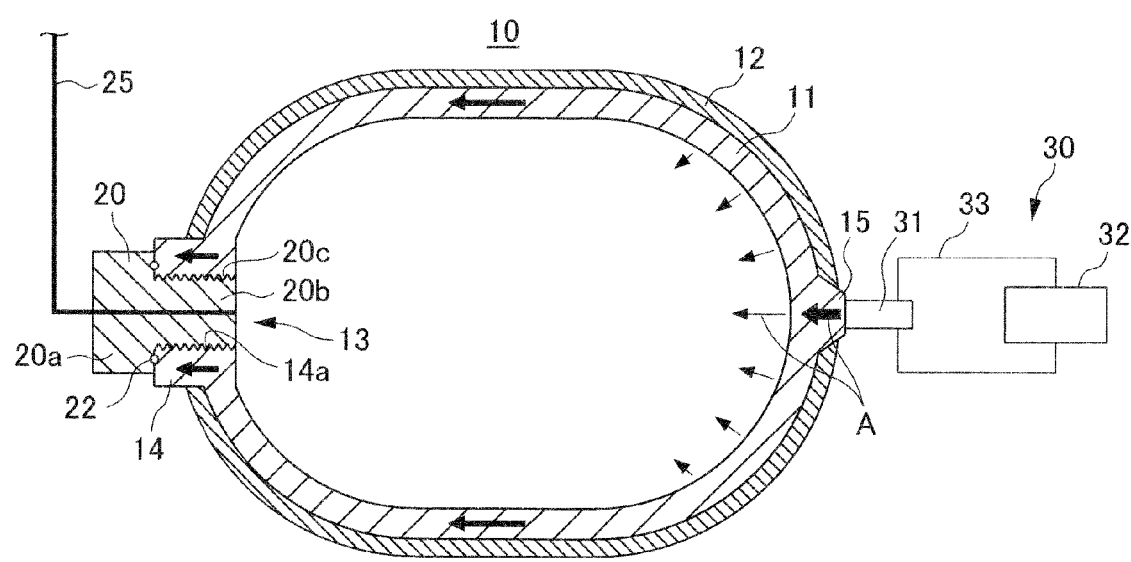
FIG. 1 is a sectional view illustrating the high-pressure tank according to the first embodiment of the present invention.
Figure 2:
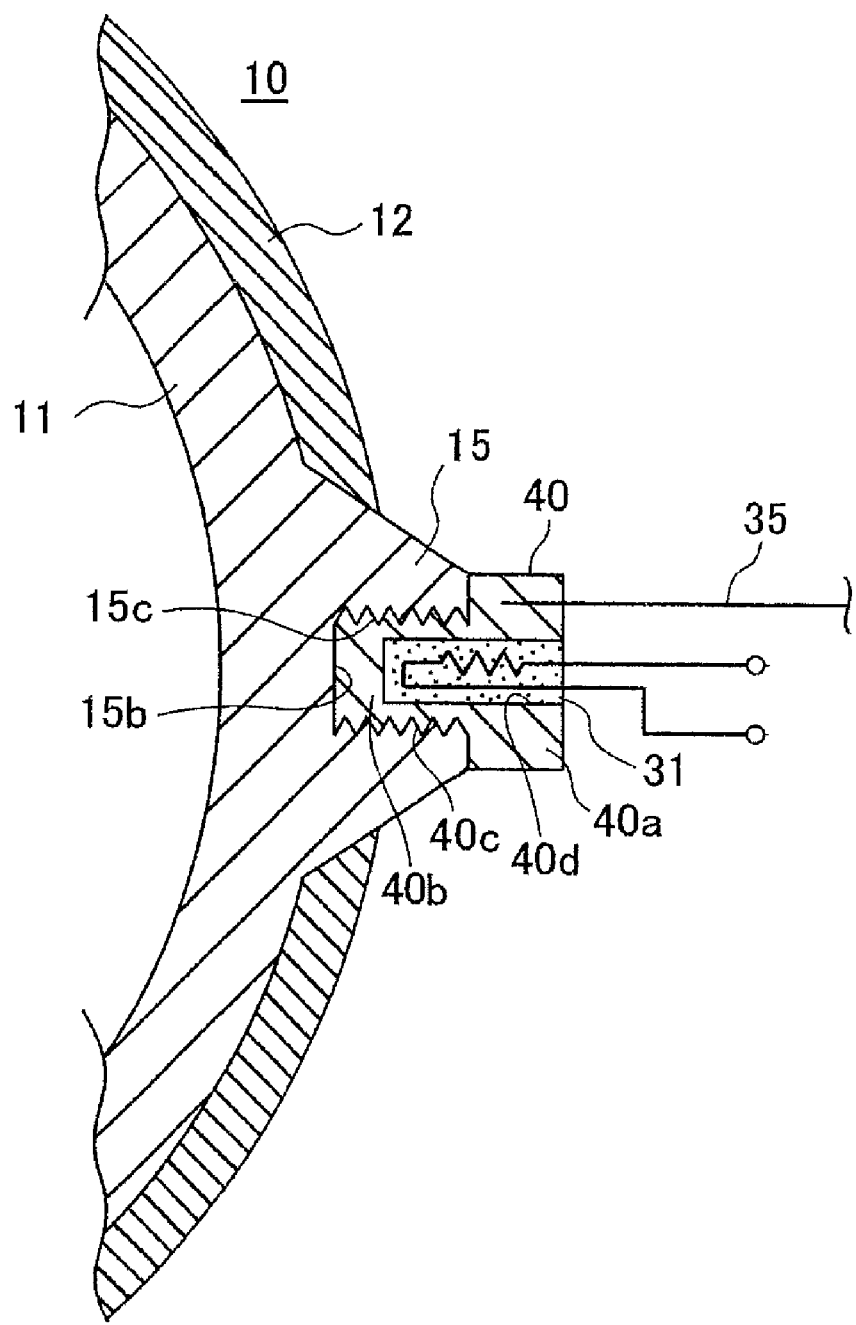
FIG. 2 is an enlarged sectional view illustrating the part on which the electric heater is mounted.

FIG. 1 is a sectional view illustrating the high-pressure tank 10 according to the first embodiment of the present invention. FIG. 2 is an enlarged sectional view of the part on which the electric heater 30 of the high-pressure tank 10 is mounted.

Description of Entire High-Pressure Tank

The high-pressure tank 10 is mounted on a fuel cell vehicle, in which high-pressure hydrogen is filled. The high-pressure tank 10 is provided with the tank main body 11 having an interior space, on which the base part 14 is formed, the cap member 20 mounted on the base part 14, and the reinforcement member 12 covering the outer surface of this tank main body 11.

The tank main body 11 is formed of aluminum alloy and the like, in which high-pressure hydrogen gas is filled. In the present embodiment, the tank main body 11 is formed of aluminum alloy with excellent thermal conductivity, but not limited thereto, and it may be formed of resin. The base part 14 has a cylindrical shape provided at the first side of the tank main body 11, at which the opening part 13 communicating with the interior space and the outside of tank main body 11 is formed. The female screw 14a is provided on the inner face of the base part 14. The reinforcement member 12 reinforces the tank main body 11, which is formed by wrapping a reinforced fiber such as a carbon fiber on which adhesive such as epoxy resin adheres around the tank main body 11.

The cap member 20 is provided with a head part 20a, and a neck part 20b on the outer face of which the male screw 20c is formed. The gas pipe 25 in which high-pressure hydrogen gas circulates penetrates this cap member 20. The cap member 20 is mounted on the base part 14 by threadably mounting the male screw 20c of this cap member 20 on the female screw 14a of the base part 14. The rubber seal member 22 such as a O-ring is installed between the head part of the cap member 20 and the top end face of the base part 14. The interior space of the tank main body 11 is sealed by mounting the mounting cap member 20 on the base part 14 with holding this seal member 22 therebetween.

Description of Outer Projecting Part

The outer projecting part 15 as the exposed part is projectably formed outward at the end part opposite to the base part 14 of the tank main body 11 or is at a position different from the opening part 13. This outer projecting part 15 is not covered with the reinforcement member 12, but exposed outward. The outer projecting part 15 may be exposed by devising means of wrapping the reinforcement member 12. The tank main body 11 is manufactured through a flow-forming process, a spinning process, and the like. However, a part of tank main body 11 is required to be held in this molding process, whereby the outer projecting part 15 is formed as this held part.

The hole part 15b at which the female screw 15c is formed is provided on the top end face of the outer projecting part 15, and the heater mounting member 40 is mounted detachably on this hole 15b. It is easy to mount the heater mounting member 40 because the outer projecting part 15 is exposed outward.

The heater mounting member 40 is a hexagon bolt, which is provided with the head part 40a embedded with the thermal sensor 35, and the neck part 40b on which the male screw 40c is formed. In addition, the heater mounting hole 40d extending from the head part 40a to the neck part 40b is formed in the heater mounting member 40. The heater mounting member 40 is mounted on the outer projecting part 15 by threadably mounting the male screw 40c of this heater mounting member 40 on the female screw 15c of the outer projecting part 15. As a material of this heater mounting member 40, for example, an material with excellent thermal conductivity such as the aluminum alloys is preferable. As shown in the below-mentioned second embodiment, the heater mounting member 40 may not be threadably mounted on the outer projecting part 15 directly, but may be mounted on the outer projecting part 15 with the screw that is another member.

The thermal sensor 35 measures the temperature of the heater mounting member 40 and outputs the measured temperature to the electronic control unit through a thermometry circuit that is not shown in the figure. The electronic control unit estimates the temperature of the seal member 22 based on the temperature output from the thermal sensor 35. Specifically, the correlation data between the measured temperature of the thermal sensor 35 and the temperature of the seal member 22 is preliminarily recorded in experimentation, and then the temperature of the seal member 22 is estimated based on this data. In the present embodiment, the temperature of the heater mounting member 40 is measured by the thermal sensor 35, but not limited thereto; the temperature of the seal member 22 may be measured directly, and the temperature in the opening part 13 of the base part 14 may be measured.

Description of Electric Heater

The high-pressure tank 10 is provided with an electric heater 30 as a heater heating the outer projecting part 15 from the outside of the tank main body 11. The electric heater 30 is provided with the cylinder shape heater 31 accommodating the heating unit such as nichrome wire and a power supply 32 supplying power to this rot-shaped heater through the wiring 33. The heater 31 of this electric heater 30 is inserted into the heater mounting hole 40d of the heater mounting member 40.

The electric heater 30 heats the outer projecting part 15 from the outside of high-pressure tank 10, and thereby transferring heat as represented by the arrow A in FIG. 1, and thus the hydrogen accommodated in the high-pressure tank 10 is heated.

Description of Heating Control

Figure 3:
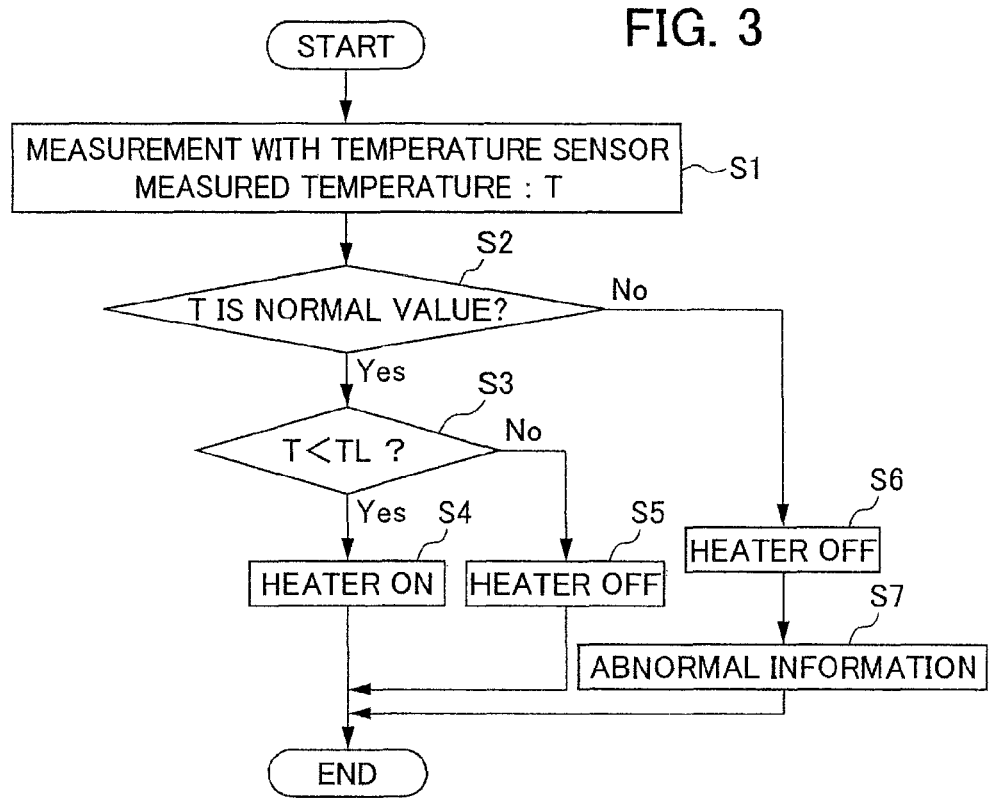
FIG. 3 is a flow chart illustrating the control method of the electric heater.

Next, control of the electric heater 30 by the electronic control unit is described with reference to the flow chart of FIG. 3.

First, in the step S1, the temperature of heater mounting member 40 is measured by the thermal sensor 35, and this measured temperature is defined as T. At this point, there is a correlation with the measured temperature T and the temperature of the seal member 22, so that the temperature of the seal member 22 can be estimated based on the measured temperature T.

Second, the step S2 determines whether or not the measured temperature T is a normal value. The normal value is a temperature from which it can be estimated that constructional elements of the temperature measurement system including the thermal sensor 35 are functioning normally. If the determination in the step S2 is "YES", the processing proceeds to the step S3.

On the other hand, if the determination in step S2 is "NO", constructional elements of the temperature measurement system including the thermal sensor 35 is abnormal, and thus the processing proceeds to the step S6 to turn off the electric heater 30. Then, the processing moves to the step S7 to inform a driver of abnormality and ends.

The step S3 determines whether or not the measured temperature T is less than the determination temperature TL. When the low temperature at which the function of the seal member 22 is not likely to be preserved is defined as the limiting temperature, the determination temperature TL is set to a temperature higher than this limiting temperature. If the determination in the step S3 is "YES", the electric heater 30 is turned on to heat the outer projecting part 15, and then the processing ends.

On the other hand, if the determination in step S3 is "NO", heating by electric heater 30 is unnecessary because the elasticity of the seal member 22 may not deteriorate due to low temperature, and thus the electric heater 30 is turned off, and then the processing ends.

Figure 4:
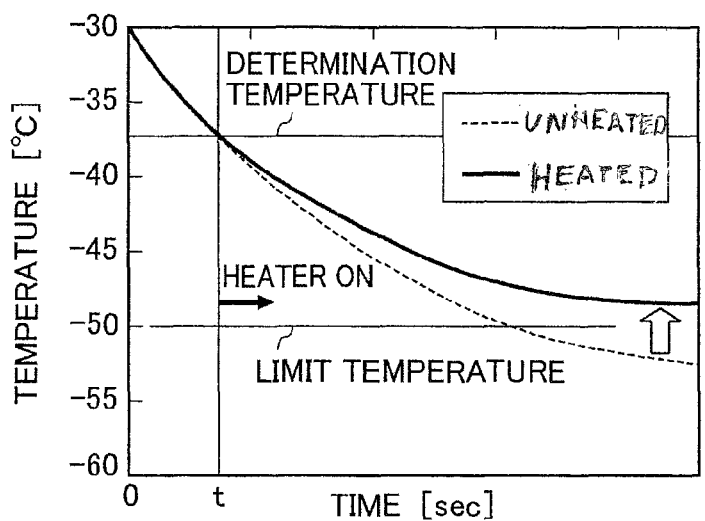
FIG. 4 is a graph illustrating temperature change by heating the electric heater.

FIG. 4 is a graph illustrating change of the measured temperature T. For example, the limiting temperature at which the function of the seal member 22 cannot be preserved is set to "−50° C.", and then the determination temperature TL is set to "−37° C." based on this limiting temperature.

The temperature of the seal member 22 decreases over from the time 0 to t. The measured temperature T is less than "−37° C." at the time t, and then the electric heater 30 is turned on.

Accordingly, the entire high-pressure tank 10 is warmed by heating this electric heater 30 through the outer projecting part 15 after the time t, and thus, as shown by the continuous line in FIG. 4, the measured temperature T decreases gradually and then becomes constant, but never falls below the limitation temperature "−50° C.". On the other hand, in the case of no heating by electric heater 30, the measured temperature T decreases over time to fall below the limiting temperature "−50° C." after the time t, so that the degradation of the seal member 22 may progress, as shown by the dashed line in FIG. 4.

In the present embodiment, the determination temperature TL is set, and the electric heater 30 is turned on when the measured temperature T is less than this measured temperature TL, but not limited thereto; the decreasing rate of the measured temperature T over time may be monitored, and then the electric heater 30 may be turned on when the decreasing rate of this measured temperature T is substantial.

According to the above-mentioned high-pressure tank 10, the following effects are achieved. That is, the outer projecting part 15 provided to a position different from the opening part 13 is heated with the electric heater 30, whereby the entire tank main body 11 can be warmed through this outer projecting part 15, and thus excess reduction in the temperature of the seal member 22 provided at the opening part 13 can be suppressed. Therefore, even under low temperature condition, deterioration of the seal member 22, which causes the sealing properties to degrade, can be suppressed, whereby the gas leaks from the tank main body 11 can be effectively suppressed.

The outer projecting part 15 provided at a position different from the opening part 13 is heated, so that a space for mounting the electric heater 30 can be easily secured. In addition, since the outer projecting part 15 is heated with the electric heater 30, the electric heater 30 does not directly contact with high-pressure gas in the tank main body 11. Therefore, a structure for withstanding high pressure is unnecessary for the electric heater 30, whereby the parts count can be reduced, and thus the size and weight of the entire device can be reduced.

In addition, the tank main body 11 is heated through the outer projecting part 15, and then gas in the tank main body is warmed 11 by properly heating the outer projecting part 15 with the electric heater 30 under low temperature condition, so that the range of the gas temperature change can be reduced.

Furthermore, the temperature change of the tank main body 11 is reduced when the tank main body is properly heated 11 with the electric heater 30. Accordingly, the thermal stress generated by the difference between the thermal expansion coefficients of the tank main body 11 and the reinforcement member 12 can be reduced, and thus reduction in the durability of the high-pressure tank 10 can be suppressed.

Since the projecting portion formed during this molding process as the outer projecting part 15 is used, substantial structural modification for mounting the electric heater 30 is unnecessary, so that the rise in manufacturing cost can be suppressed.

In addition, the outer projecting part 15 is at a position different from the opening part 13 as described above, so that the tank main body 11 can be heated without contacting the electric heater 30 with a member provided to the vicinity of the opening part 13. Furthermore, since the tank main body 11 is formed of the aluminum alloy with excellent thermal conductivity, the vicinity of the opening part 13 can be heated through thermal conduction of the tank main body 11 even when the outer projecting part 15 away from the opening part 13 is heated.

In addition, since the outer projecting part 15 is not a circulation channel of inflammable gas such as hydrogen unlike the opening part 13, the tank main body 11 can be safely heated by heating the outer projecting part 15.

The electric heater 30 is mounted detachable from the outer projecting part 15 of the tank main body 11, whereby, for example, the electric heater 30 is detached once, when the mounting locations of the tank main body 11 and the reinforcement member 12 are moved, and the electric heater 30 is attached after the tank main body 11 and the reinforcement member 12 are moved. Accordingly, the electric heater 30 can be prevented from being damaged and broken down caused by accidental contact and the like, while the tank main body 11 and the reinforcement member 12, which are heavy parts, are being moved. In addition, the flexibility of the mounting layout of the high-pressure tank 10 can be improved compared with the case in which the electric heater 30 is undetachable. Furthermore, even if the electric heater 30 breaks down, this electric heater 30 can be easily replaced with a non-defective heater.

The temperature at which the function of the seal member can be preserved 22 is defined as the determination temperature TL, and then the electric heater 30 is operated when the gas temperature measured or estimated by the thermal sensor 35 is less than this determination temperature TL. Accordingly, the tank main body 11 can be heated only when required, and thus heating it efficiently. In addition, as described above, the seal member 22 deteriorates when the temperature is equal to or less than a predetermined extremely low temperature (e.g. −50° C.), which causes the sealing properties to degrade. Accordingly, deterioration of the seal member 22 can be suppressed effectively by properly setting the determination temperature TL to be higher than this predetermined temperature.

The electric heater 30 is used so that the size of the heater can be reduced compared with a heat exchange means such as a conventional hydrogen storing alloy accommodating container. Accordingly, the electric heater 30 can be easily detached from the tank main body 11 by threadably mounting the electric heater 30 on the tank main body 11. In addition, the electric heater 30 is operated when the gas temperature is less than the predetermined determination temperature TL as described above, so that the electric power consumption can be reduced. Thus, as a power supply of the electric heater 30, a small external source mounted separately and a battery mounted on the vehicle can be used. Accordingly, the parts count as well as the size and the weight of the entire device can be reduced.

Figure 5:
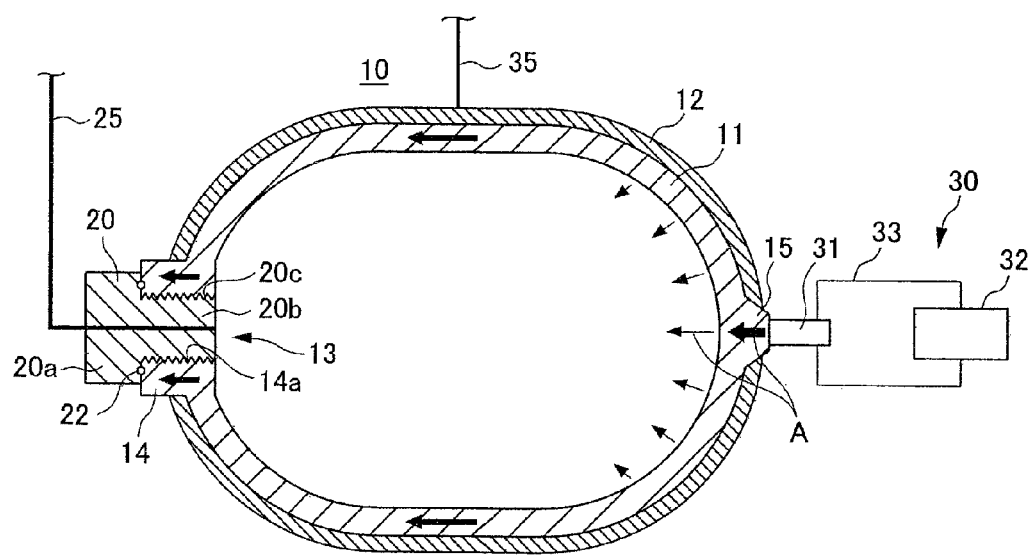
FIG. 5 is a sectional view illustrating the disposition of the thermal sensor according to the first variation of the present invention.
Figure 6:
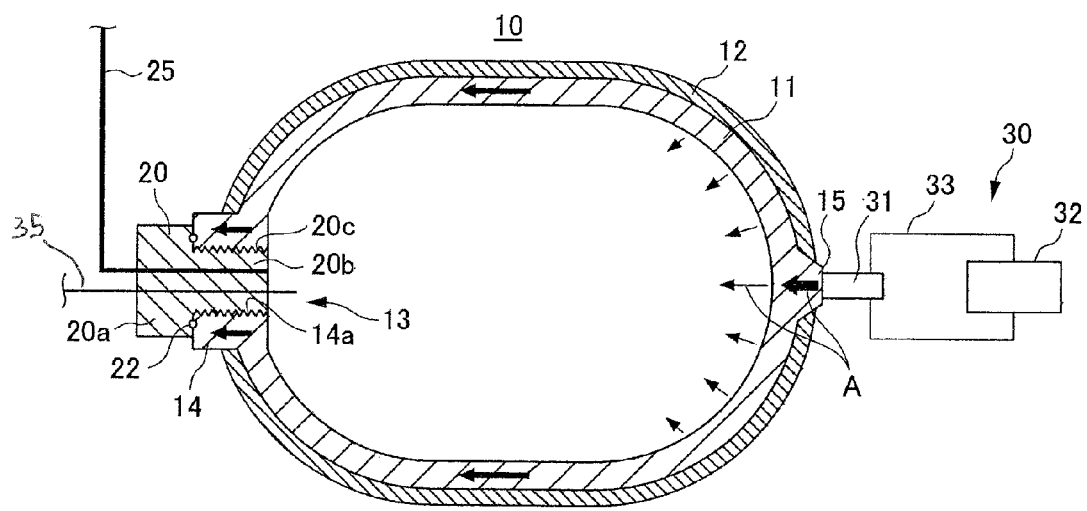
FIG. 6 is a sectional view illustrating the disposition of the thermal sensor according to the second variation of the present invention.

In the first embodiment, the thermal sensor 35 is provided at the heater mounting member 40, and then the temperature of the seal member 22 is estimated based on the temperature of this heater mounting member 40, but not limited thereto. Thus, as shown in FIG. 5, the temperature of the reinforcement member 12 of the high-pressure tank 10 may be measured by the thermal sensor 35, and then the temperature of the seal member 22 may be estimated based on the temperature of this reinforcement member 12. Alternatively, as shown in FIG. 6, the thermal sensor 35 may be inserted through the opening part 13 of the base part 14 to be provided in tank main body 11, the gas temperature in the tank main body 11 may be measured, and then the temperature of the seal member 22 may be estimated based on this gas temperature in the tank main body 11.

In addition, the high-pressure tank according to the present invention can be mounted on a vehicle such as a CNG vehicle on which no fuel cells are mounted.

Second Embodiment

Figure 7:
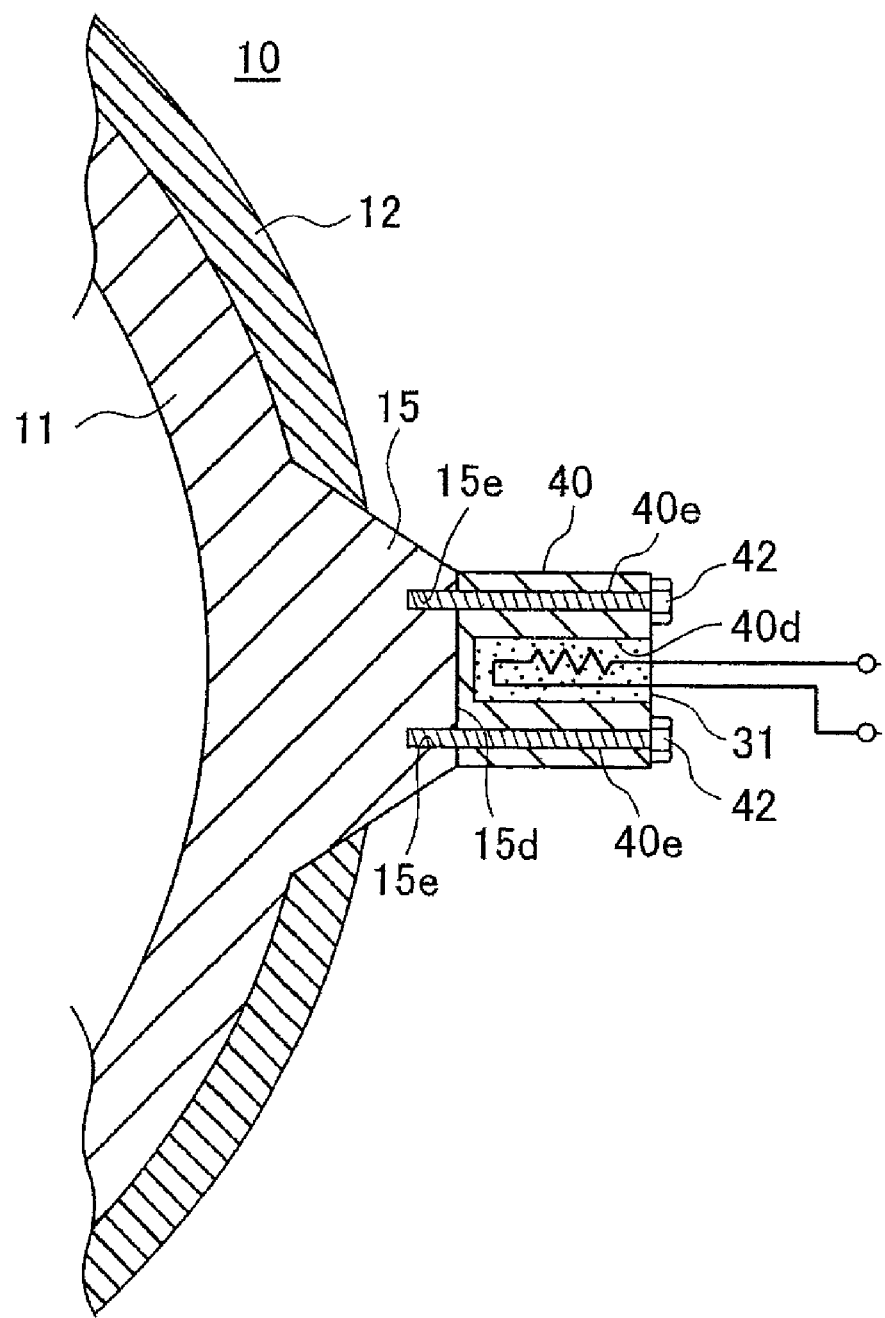
FIG. 7 is a local sectional view illustrating an example of mounting the electric heater according to the second embodiment of the present invention.

FIG. 7 is a local sectional view illustrating a portion on which the electric heater of the high-pressure tank 10 according to the second embodiment of the present invention is mounted. In order to omit or simplify explanations of the following embodiments, the same elements are indicated by the same numerals.

This second embodiment differs from the first embodiment in the way that the heater mounting member 40 is fixed on the outer projecting part 15 with the screw 42. In other words, the heater mounting member 40 is provided with the through hole 40e through which the screw 42 is inserted. On the top end face 15d of the outer projecting part 15, the hole part 15b is not provided, but two screw holes 15e are provided. The screw 42 is inserted through the hole 40e of the heater mounting member 40, and threadably mounted on the screw hole 15e of the outer projecting part 15. Accordingly, the heater mounting member 40 is detachably fixed on the outer projecting part 15.

According to the high-pressure tank 10 of this second embodiment, the heater mounting member 40 is detachably configured with the screw 42 for the outer projecting part 15, whereby effects similar to those of the first embodiment are achieved.

Third Embodiment

Figure 8:
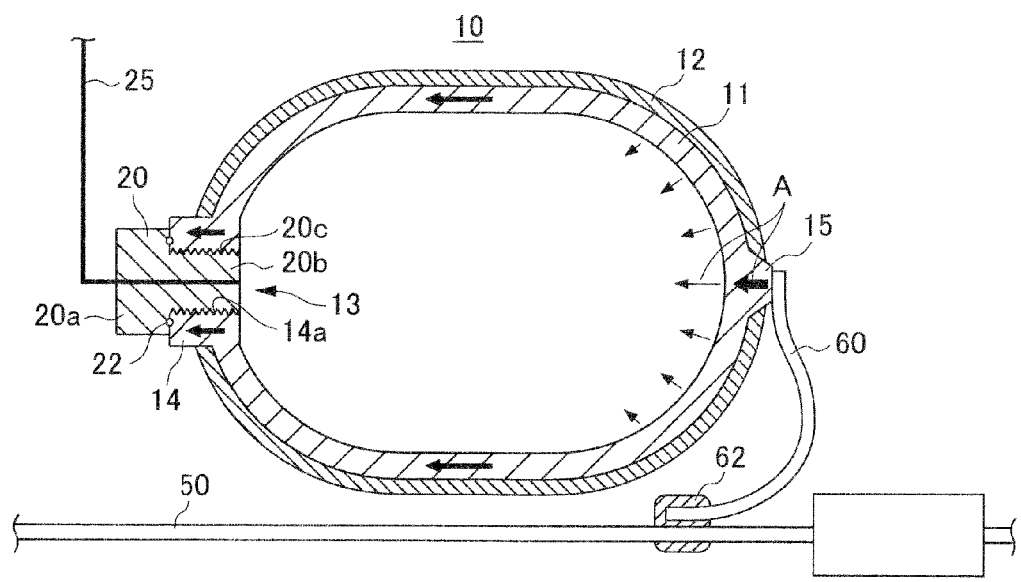
FIG. 8 is a sectional view illustrating the high-pressure tank according to the third embodiment of the present invention.

FIG. 8 is a sectional view illustrating the high-pressure tank 10 according to the third embodiment of the present invention. This third embodiment differs from the first embodiment in the way that the high-pressure tank 10 is mounted on a vehicle, and the tank main body 11 is heated by using heat exhausted from the exhaust pipe 50.

Thus, the heat pipe 60 is connected with the exhaust pipe 50 of the vehicle through the connecting member 62. The top end side of this heat pipe 60 is connected with the outer projecting part 15 of the tank main body 11.

According to high-pressure tank 10 of this third embodiment, the following effects are achieved. That is, the vehicle is used under a conditionally-severe environment such as a cold district, whereby heating with heat exhausted from the exhaust pipe 50 becomes especially effective.

In addition, since gas in the tank main body 11 decreases, and the temperature in the tank main body 11 lowers, as the travel distance increases, it is necessary to suppress degradation of the sealing properties of the seal member 22 by heating the tank main body 11. However, since waste heat generated in the exhaust pipe 50 increases as the travel distance of the vehicle increases, the tank main body 11 can be heated with a simple structure but without complex control by using this waste heat, and thus the cost can be reduced.

In the third embodiment, as a heat source of the power plant for a vehicle, the exhaust pipe 50 is mentioned, but not limited thereto; for example, catalyst may be used. In addition, the power plant for a vehicle includes a reciprocating engine using high-pressure gas such as natural gas and hydrogen as fuel.

Fourth Embodiment

Figure 9:
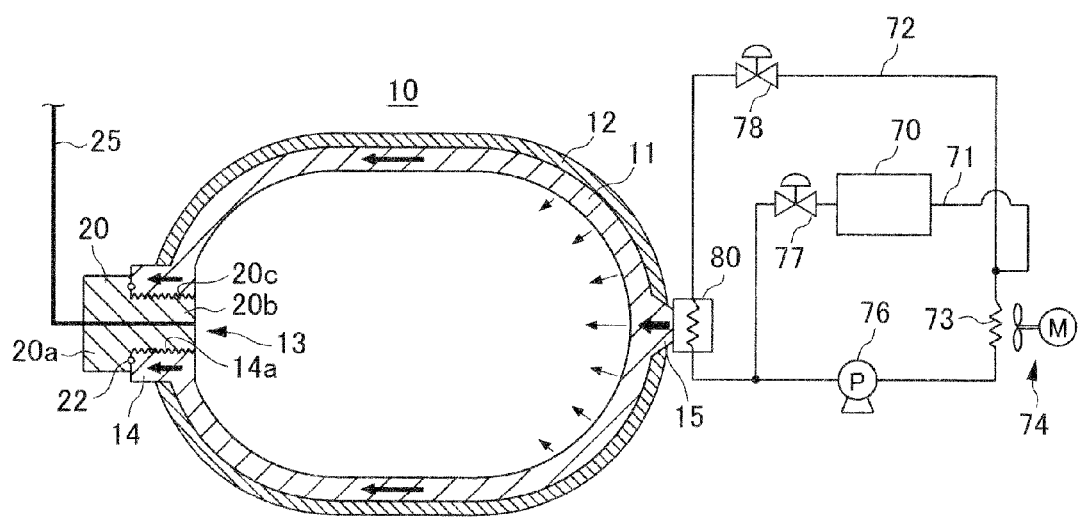
FIG. 9 is a sectional view illustrating the high-pressure tank according to the fourth embodiment of the present invention.

FIG. 9 is a sectional view illustrating the high-pressure tank 10 according to the fourth embodiment of the present invention. The high-pressure tank 10 according to this fourth embodiment differs from that of the first embodiment in the way that the high-pressure tank 10 is mounted on a vehicle provided with the fuel cell 70, and the tank main body 11 is heated by using waste heat obtained from the cooling system for the fuel cell.

This cooling system for the fuel cell is to cool the fuel cell generating heat by electrochemical reaction. This cooling system for the fuel cell is provided with the first pipe 71 circulating coolant in the fuel cell 70, the radiator 73 provided in the first pipe 71, the fan 74 sending air to the radiator 73, the pump 76 circulating coolant to the first pipe 71, the second pipe 72 connected with the first pipe 71, which bypasses the fuel cell 70, and the heat exchanger 80 exchanging heat between coolant circulating in the second pipe 72 and the outer projecting part 15. In addition, the first valve 77 is provided in the first pipe 71, and the second valve 78 is provided in the second pipe 72.

According to this cooling system for the fuel cell, heat exhausted from the fuel cell 70 is transferred to the heat exchanger 80 through coolant by properly opening and closing the first valve 77 and the second valve 78, the outer projecting part 15 is heated by this heat, and then the tank main body 11 is heated.

According to the high-pressure tank 10 according to this fourth embodiment, the energy cost for heating the tank main body 11 can be reduced by using waste heat obtained from the cooling system for the fuel cell to heat the tank main body 11.

Fifth Embodiment

Figure 10:
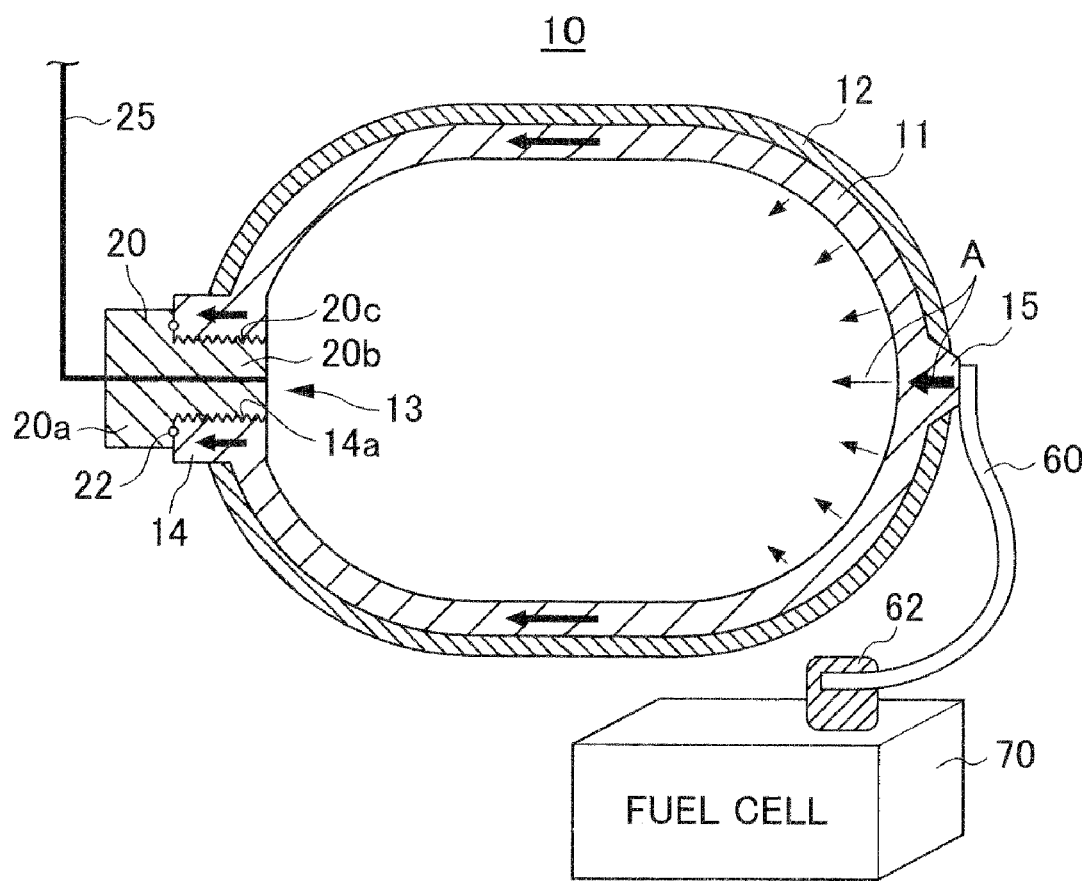
FIG. 10 is a sectional view illustrating the high-pressure tank according to the fifth embodiment of the present invention.

FIG. 10 is a sectional view illustrating the high-pressure tank 10 according to the fifth embodiment of the present invention. The high-pressure tank 10 according to this fifth embodiment differs from that of the first embodiment in the way that the high-pressure tank 10 is mounted on a vehicle provided with the fuel cell 70, and the tank main body 11 is heated by using waste heat from the fuel cell 70.

Thus, the heat pipe 60 is connected with the fuel cell 70 through the connecting member 62. The top end side of this heat pipe 60 is connected with the outer projecting part 15 of the tank main body 11.

According to the high-pressure tank 10 of this fifth embodiment, the energy cost for heating the tank main body 11 can be reduced by using waste heat obtained from the fuel cell 70 to heat the tank main body 11.

Sixth Embodiment

Figure 11:
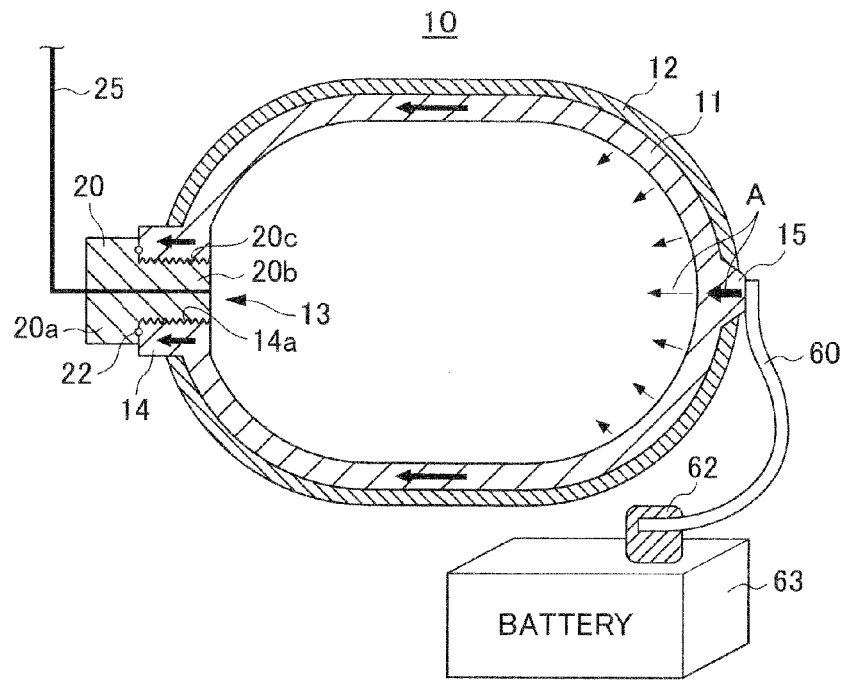
FIG. 11 is a sectional view illustrating the high-pressure tank according to the sixth embodiment of the present invention.

FIG. 11 is a sectional view illustrating the high-pressure tank 10 according to the sixth embodiment of the present invention. The high-pressure tank 10 according to this sixth embodiment differs from that of the first embodiment in the way that the high-pressure tank 10 is mounted on a vehicle provided with the battery 63, and the tank main body 11 is heated by using waste heat from the battery 63.

Thus, the heat pipe 60 is connected with the battery 63 through the connecting member 62. The top end side of this heat pipe 60 is connected with the outer projecting part 15 of the tank main body 11.

According to the high-pressure tank 10 of this sixth embodiment, the energy cost for heating the tank main body 11 can be reduced by using waste heat obtained from the battery 63 to heat the tank main body 11.

Seventh Embodiment

Figure 12:
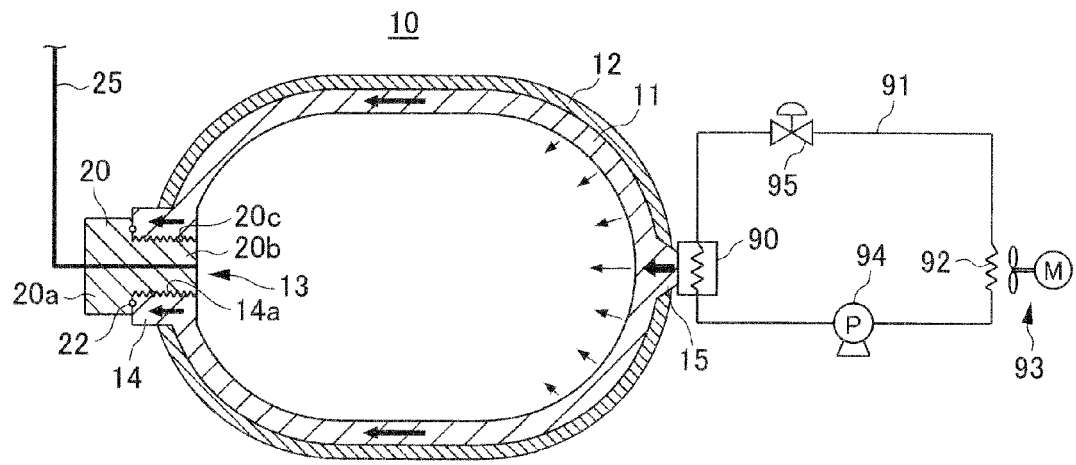
FIG. 12 is a sectional view illustrating the high-pressure tank according to the seventh embodiment of the present invention.

FIG. 12 is a sectional view illustrating the high-pressure tank 10 according to the seventh embodiment of the present invention. The high-pressure tank 10 according to this seventh embodiment differs from that of the first embodiment in the way that the high-pressure tank 10 is mounted on a vehicle provided with an air conditioning system, and the tank main body 11 is heated by using waste heat from the heat exchanger 90 of the air conditioning system.

This air conditioning system is to condition air in the vehicle. This air conditioning system is provided with the pipe 91 circulating coolant, the radiator 92 provided in the pipe 91, the fan 93 sending air to the radiator 92, the pump 94 circulating coolant to the pipe 91, and the heat exchanger 90 exchanging heat between coolant circulating in the pipe 91 and the outer projecting part 15. In addition, the valve 95 is provided in the pipe 91.

According to this air conditioning system for the fuel cell, coolant is circulated in the pipe 91 by properly opening and closing the valve 95, heat from the coolant is transferred to the heat exchanger 90, the outer projecting part 15 is heated by this heat, and then the tank main body 11 is heated.

According to the high-pressure tank 10 according to this seventh embodiment, the energy cost for heating the tank main body 11 can be reduced by using waste heat obtained from the air conditioning system to heat the tank main body 11.

Furthermore, as a heat source, waste heat from an electrically equipped unit, a motor, a compressor for air-conditioning, and the like may be used. In these cases, the energy cost for heating the tank main body 11 can be also reduced.

Furthermore, the present invention is not limited to the above-mentioned embodiments, and variations and modifications are included within the scope to achieve the object of the present invention.

While preferred embodiments of the present invention have been described and illustrated above, it is to be understood that they are exemplary of the invention and are not to be considered to be limiting. Additions, omissions, substitutions, and other modifications can be made thereto without departing from the spirit or scope of the present invention. Accordingly, the invention is not to be considered to be limited by the foregoing description and is only limited by the scope of the appended claims.

What is claimed is:

1. A high-pressure tank comprising:
a tank main body having an opening part, in which high-pressure gas is filled;
a reinforcement member covering an outer surface of the tank main body and reinforcing the tank main body, where
the tank main body is provided with an exposed part being uncovered with the reinforcement member at a position different from the opening part, and
the exposed part is an outer projecting part projectably formed outward when the tank main body is manufactured; and
a heating source for heating the exposed projecting part from the outside of the tank main body, the heat distributed through the tank main body via thermal conduction from the projecting part.

2. The high-pressure tank according to claim 1, wherein the high-pressure tank is mounted on a vehicle, and the heating source heats the tank main body by using heat exhausted from a power plant for the vehicle, using waste heat from a battery of the vehicle, or using heat obtained from a heat exchanger of an air conditioning system for the vehicle.

3. The high-pressure tank according to claim 1, wherein the high-pressure tank is mounted on a vehicle provided with a fuel cell, and the heater heating source heats the tank main body by using waste heat from the fuel cell, or using heat obtained from a heat exchanger of a cooling system for the fuel cell.

4. A high-pressure tank comprising:
a tank main body having an opening part, in which high-pressure gas is filled;
a reinforcement member covering an outer surface of the tank main body and reinforcing the tank main body, where
the tank main body is provided with an exposed part being uncovered with the reinforcement member at a position different from the opening part, and
the exposed part is an outer projecting part projectably formed outward when the tank main body is manufactured;
a heating source for heating the exposed projecting part from the outside of the tank main body, the heat distributed through the tank main body via thermal conduction from the projecting part; and
a thermal sensor and an electronic control unit measuring or estimating the temperature of a seal member provided on the opening part, wherein when the temperature measured or estimated by the thermal sensor and the electronic control unit is less than a determination temperature at which the function of the seal member can be preserved, the heating source is operated.

5. The high-pressure tank according to claim 4, wherein the high-pressure tank is mounted on a vehicle, and the heating source heats the tank main body by using heat exhausted from a power plant for the vehicle, using waste heat from a battery of the vehicle, or using heat obtained from a heat exchanger of an air conditioning system for the vehicle.

6. The high-pressure tank according to claim 4, wherein the high-pressure tank is mounted on a vehicle provided with a fuel cell, and the heating source heats the tank main body by using waste heat from the fuel cell, or using heat obtained from a heat exchanger of a cooling system for the fuel cell.

7. The high-pressure tank according to claim 4, wherein the heating source is an electric heater.

* * * * *